(12) United States Patent
Ekin (10) Patent No.: US 9,946,734 B2
(45) Date of Patent: *Apr. 17, 2018

(54) PORTABLE VEHICLE MONITORING SYSTEM

(71) Applicant: EKIN TEKNOLOJI SANAYI VE TICARET ANONIM SIRKETI, Istanbul (TR)

(72) Inventor: Akif Ekin, Istanbul (TR)

(73) Assignee: EKIN TEKNOLOJI SANAYI VE TICARET ANONIM SIRKETI, Istanbul (TR)

( * ) Notice: Subject to any disclaimer, the term of this patent is extended or adjusted under 35 U.S.C. 154(b) by 0 days.

This patent is subject to a terminal disclaimer.

(21) Appl. No.: 15/294,487

(22) Filed: Oct. 14, 2016

(65) Prior Publication Data

US 2017/0075888 A1    Mar. 16, 2017

Related U.S. Application Data

(63) Continuation-in-part of application No. 14/981,964, filed on Dec. 29, 2015, which is a
(Continued)

(51) Int. Cl.
| | |
|---|---|
| *G06K 9/00* | (2006.01) |
| *G06F 17/30* | (2006.01) |
| *H04N 5/225* | (2006.01) |
| *G06K 9/32* | (2006.01) |
| *G01S 17/06* | (2006.01) |

(Continued)

(52) U.S. Cl.
CPC .......... *G06F 17/3028* (2013.01); *B60R 11/04* (2013.01); *B60R 25/302* (2013.01); *B60R 25/32* (2013.01); *G01S 17/06* (2013.01); *G03B 17/02* (2013.01); *G06F 17/30312* (2013.01); *G06K 9/00228* (2013.01); *G06K 9/00791* (2013.01); *G06K 9/325* (2013.01); *G08G 1/0175* (2013.01); *G08G 1/04* (2013.01); *G08G 1/054* (2013.01);
(Continued)

(58) Field of Classification Search
None
See application file for complete search history.

(56) References Cited

U.S. PATENT DOCUMENTS

| | | | | |
|---|---|---|---|---|
| 9,002,313 | B2 * | 4/2015 | Sink | B60Q 1/2611 340/691.1 |
| 9,878,656 | B2 * | 1/2018 | Gergets | F21S 43/195 |

(Continued)

*Primary Examiner* — Delomia L Gilliard
(74) *Attorney, Agent, or Firm* — Gokalp Bayramoglu (57) ABSTRACT

The invention is related to a portable vehicle monitoring system that is to be mounted on mobile objects such as police cars for security purposes and ambulances which have right of way; characterized in that it comprises a camera placed on the front right and front left and both sides of the system which enables the system to capture images and recognize faces, LED lighting located around the cameras which are directed towards visual direction and which enable capturing of legible images even at night time police lights placed at the front and rear faces of the base which can flash on and off when necessary, an alarm control device, Ethernet connection forming the network, a cooling device which eliminates the heat formed inside the apparatus, a control card which operates the police lights, modem which continuously provide wireless communication and a top cover which encloses the entire system.

8 Claims, 6 Drawing Sheets

Related U.S. Application Data continuation-in-part of application No. 14/777,522, filed on Sep. 16, 2015.

(51) Int. Cl.

| | | |
|---|---|---|
| *B60R 11/04* | (2006.01) | |
| *B60R 25/30* | (2013.01) | |
| *B60R 25/32* | (2013.01) | |
| *G03B 17/02* | (2006.01) | |
| *G08G 1/017* | (2006.01) | |
| *G08G 1/054* | (2006.01) | |
| *G08G 1/04* | (2006.01) | |
| *B60Q 1/26* | (2006.01) | |
| *G03B 29/00* | (2006.01) | |

(52) U.S. Cl.
CPC ......... *H04N 5/2256* (2013.01); *B60Q 1/2611* (2013.01); *B60R 2300/50* (2013.01); *B60R 2300/8073* (2013.01); *G03B 29/00* (2013.01); *G03B 2215/0567* (2013.01); *G03B 2217/002* (2013.01)

(56) References Cited

U.S. PATENT DOCUMENTS

| | | | |
|---|---|---|---|
| 2007/0017642 A1* | 1/2007 | Bauer | B60Q 1/0023 160/10 |
| 2009/0055075 A1* | 2/2009 | Denis | F02N 11/0818 701/102 |
| 2009/0174540 A1* | 7/2009 | Smith | B60Q 1/34 340/465 |
| 2013/0066542 A1* | 3/2013 | Chung | G08G 1/04 701/119 |
| 2014/0105464 A1* | 4/2014 | Park | G06K 9/00812 382/104 |
| 2015/0175052 A1* | 6/2015 | Gergets | B60Q 1/2611 362/542 |
| 2015/0177363 A1* | 6/2015 | Hermann | G01S 5/20 367/118 |
| 2016/0140403 A1* | 5/2016 | Nagata | B60R 1/06 382/104 |
| 2016/0167668 A1* | 6/2016 | Prokhorov | B60W 30/18009 701/23 |

\* cited by examiner

PORTABLE VEHICLE MONITORING SYSTEM

CROSS-REFERENCE TO RELATED APPLICATIONS

This application is a Continuation-in-Part of U.S. application Ser. No. 14/981,964 filed on Dec. 29, 2015, which is a Continuation-in-Part of U.S. application Ser. No. 14/777,522, filed on Sep. 16, 2015, which is the national phase entry of International Application No. PCT/TR2013/000365 filed on Dec. 20, 2033 which claims priority from a Turkish patent Application No. 2013/06294 filed on May 27, 2013.

TECHNICAL FIELD

The invention is related to overcoming frequently faced problems during the usage of license plate reader (image processing), recognition, speed sensor (radar), parking violation detection, city and road scanner, all kind of gas, audio, radiation and similar sensors, object detection, tracking, classifying and face recognition, Mobile OCR Reader, 3D scanner system on the move The invention is particularly related to a license plate reader that is to be mounted on mobile vehicles such as police cars for security or surveillance purposes and ambulances which have right of way, to a speed sensing apparatus which determines the speed of all vehicles that are mobile and/or immobile in traffic. By developing a portable apparatus that is formed by combining the speed sensor, parking violation detector, city and road scanner, all kind of gas, audio, radiation and similar sensors, face recognition device and 3D laser scanner device (lidar); to reading of license plates, enquiring registration of said license plates, enquiring information of drivers and pedestrians, giving warnings and notifying the related units, generates an audio or visual alarm notification on its tablet on other applications, if necessary. All functions can be carried out by the invention even when the vehicle is on the move including time stamp in millisecond resolution, object classification info and location info with centimeter sensitivity. The invention may also be equipped with Radiation Sensor, Air Pollution Sensor and Chemical Gas Sensors to collect valuable data while on the move. The Invention uses Radar, Laser Scan, video sensor, audio sensor and thermal sensor for 3D and/or 2D object scanning, detection, recognition and tracking.

BACKGROUND OF THE INVENTION

Vehicles are defined by license plates which act as a kind of identification card nowadays. The license plates are aimed to define each vehicle by distinguishing said vehicles from each other by means of the authentic structure of the license plates. Traffic registration records, vehicle taxes, highway fees, etc are all evaluated in accordance with and are recorded in relation to, these license plate numbers.

When it is taken into account that vehicles are objects that are always on the move, it is important to carry out the necessary procedures by determining the license plate numbers correctly. This determination procedure which was carried out by people, using classic methods, until recently led to delays and more importantly led to many mistakes. Apart from this, many people had to be employed due to the large numbers of vehicles and extensive living environments (highways, roads, etc.).

Automatic camera systems have been developed in order to overcome the disadvantages mentioned above regarding the reading of license plates. The European Patent titles "Automatic License Plate Recognition System Integrated with an Electronic Toll Fee Collection System" numbered EP2088568 describes a device which charges the fees for highways to vehicles and records said fees to the license plate of vehicles on the move. In order to reach this aim, both the front and the rear photos of the vehicles are taken via cameras, and the license plate numbers with vehicle brand, model and colour information are determined by means of special software.

The license plate recognition systems that are more extensively used nowadays also operate according to the same logic. One of the characteristics of the license plate systems that are mounted fixedly to especially certain entrance and exit points of the city is that said systems continuously takes photos of the vehicles that come into sight and notifies the related posts when necessary.

The systems mentioned above do carry out the license plate reading function but they also bring along disadvantages. Said disadvantages are that these cameras are positioned fixedly as they need high source of energy and a software with an algorithm that can read plates when the vehicle is mobile. Besides this said systems have a low rate of success as they can only read plates in a limited zone.

The European Patent titled "Automatic License Plate Reader System" numbered EP137452 describes a portable system formed of a personal computer and a camera in order to overcome the disadvantages mentioned above. Although said system is portable it also has many disadvantages as it has to be operated by a person.

In the present technique the license plate recognition/ reader system operate as being integrated with speed sensing devices. This way, both controls in traffic is provided and those who are driving faster than the legal speed limits can be determined. However, said systems can only be positioned to a fixed spot due to the reasons mentioned above. Moreover, none of these systems which do not provide mobile solution comprise a face recognition system.

As a result, it has been seen as an obligation to develop the related state of art due to the inadequacy of the present solutions and the requirement for a system having a license plate reader, speed sensor and face recognition apparatus, parking violation, city and road scanner, all kinds of gas, audio, radiation and similar sensor, object detection, tracking, classifying, face recognition devices, which can be mounted on vehicles that are on the move in traffic such as security vehicles and/or which can read all of the license plates of all vehicles that have been parked. The System can sense the speed, vehicle class (truck, automobile etc.), position and orientation and detect brand, model and colour of vehicles. By determining such features hereinabove, the mobile system works as a parking management and parking enforcement scanner as well. The system can also be used as a mobile tolling system based on vehicle classification, plate, location and time. The system can also be used as a mobile and fixed traffic analysis and traffic management, traffic flow rate, traffic density, maximum-average-traffic flow speed, congestion prediction and detection system.

The System can perform face recognition automatically and while on move, faces can be searched on one or more databases. It can search and determine an alarm based on white and black list. All faces are stored in the system automatically based on time and location. The system performs as a mobile face scanner, mobile OCR reader of the city, which can remotely perform enquiry through its own database and other databases, which can send a visual and audio warning to the related post and the user in the case, that the license plate of the vehicles that are searched for, are determined.

The system can also sense air quality, several gasses including but not limited to the chemical gasses, gas leaks, and radiation levels and transfer the date to the centre, generates an audio or visual alarm notification on its tablet on other applications, herewith any potential threads can be sensed and determined in a very early stage. The command and control centre has all the information to take the countermeasures. Since at least one or more mobile systems are collecting data, the data resolution gets higher with the number of mobile systems.

The invention performs automatic speed measurement for all the vehicles in the field of view; speed violation detection whether the Patrol vehicle is on the move or parked, different speed limit adjustment for different lanes, automatic official fine or report issuing containing required violation information, high-resolution violation photos and video including speed values and coordinates information.

The invention performs map creation; multi-layered and interactive map support, active map display of all devices managed by the system, camera location information through GPS and map integration. This invention can transfer all the date detected to the relevant centre, generates an audio or visual alarm notification on its tablet on other applications, herewith any potential threads can be sensed and determined in a very early stage; the invention can communicate with all other Ekin solutions using the wireless communication infrastructure. Moreover, via monitoring on a digital map at the control centre feature, Ekin Patrol vehicles can be directed to the incident scenes immediately.

SUMMARY OF THE INVENTION

The aim of the invention is to have different technical characteristics which can provide a new development in this field different to the embodiments used in the present technique.

The principal aim of the portable license plate reader and the speed sensor and face recognition and city and road scanner, all kinds of gas, audio, radiation and similar sensors, object detection, tracking, parking violation, classifying, 3D scanner apparatus which can perform simultaneously in all lanes, enables to provide traffic supervision and order for security forces such as traffic police, in their vehicles when they are on the move or not.

Said portable plate reader, mobile OCR Reader, speed sensor and face recognition apparatus; forms a compact and integrated apparatus comprising a license plate reader system, a speed sensor device, a laser scan device, a face recognition system and city and road scanner, all kinds of gas, audio, radiation and similar sensors, object detection, tracking, parking violation, classifying, 3D scanner and a server connected thereto, a warning system and flashers of security vehicles.

Another aim of the invention is to run the information obtained during license plate reading and face recognition procedures and other procedures herein in its own database or enquire said information in other databases, and to notify the automatic enquiry results to the user and generate an audio or visual alarm notification on its tablet, and other applications Another aim of the invention is to enable the automatic detection of the speed of vehicles and to automatically read the license plate of vehicles that are on the move and are parked/immobile, wherein said system is mounted onto vehicles that are mobile.

Another aim of the invention is for the system to enquire the information obtained during automatic plate reading, OCR reading and face recognition procedures in its own database and other related databases and notifying said enquiry results to the user automatically and generate an audio or visual alarm notification on its tablet, and/or other applications.

Another aim of the invention is for the system to be able to send automatic audio and visual warnings to the related posts and to the users in the case that the license plates of the vehicles are determined during enquiry.

Another aim of the invention is for the system to be able to send automatic audio and visual warnings to the related posts and to the users in the case that the faces of people are recognized during enquiry.

Another aim of the invention is for the system to automatically recognize the persons that are being searched for and to automatically apply by scanning up to a 180 degree angle of the face recognition system with the MFR (Mobile Face Recognition) defined as the face recognition system when the object is mobile or at a fixed position under fixed conditions or where the relative speed is maximum 100 km/h.

Another aim of the invention is for the system to be able to be mounted in the same way as the present beacon lamp is mounted without damaging the vehicle and without carrying out any kind of change on the vehicle that it is to be mounted on, during the mounting onto said vehicle by means of its plug & play feature.

Another aim of the invention is to be able to convert any kind brand or model vehicle, due to its plug and play feature, and said system shall be suitable to be used not only in patrol cars but at the same time in vehicles that have right of way such as ambulances.

Another aim of the invention is to be able to use the system as it has a compact structure, in vehicles without causing area restriction and visual pollution, and without said system consuming extra space inside the vehicle, whereby said system can be mounted without carrying out any kind of change on the infrastructure used, in order to mount a beacon onto the vehicle by means of its plug and play structure.

Another aim of the invention is to provide a one and only system which performs automatic license plate determination and automatic speed determination for all five lanes including the two lanes on the left, two lanes on the right and the lane that the smart vehicle is travelling in, (including the vehicles moving in the same direction and in the opposite direction) when the smart vehicle is on the move, and to keep a record of violation and to share this record with the headquarters.

Another aim of the invention is to provide a system which is one and only in the world which enables to read the license plates in five lanes at the same time. The apparatus does not require travels to be carried out in the middle lane, but it can carry out license plate reading in five lanes including the vehicles that are travelling from the opposite lane.

Another aim of the invention is to provide a one and only system, which is located between the fixed license plate reading station and mobile smart devices or between two or more than two mobile smart device vehicles utilizing the same system wherein said system can calculate the average speed of any of the vehicles that are on the move.

Another aim of the invention is to adjust synchronization between a plurality of smart systems, to ensure the simultaneous and coordinated flashing on and off of for example red-blue warning lights by connecting them virtually to each other, in smart vehicles travelling consecutively on the same road, utilizing said system, and to provide safety in connection therewith.

Another aim of the invention is to provide communication between a plurality of smart systems which continuously shares the position information of vehicles, and all other vehicle information (license plate, images, speed) with each other, thereby notifying the enquiry information to the user in order to ensure that the necessary actions are taken as soon as possible.

Another aim of the invention is to read the license plates of smart vehicles which are on the move or vehicles that are parked, in order to determine if the vehicles have been parked by mistake/incorrectly or in places where parking is illegal and to carry out the necessary penal actions. Exact parking location, parking position and orientation is detected by lidar technology which is integrated inside.

Another aim of the invention is to be able to record in a single centre the information recorded by all image capturing and audio recording devices by operating as a mobile data collection and data transfer centre and is to enable easy access to information.

Another aim of the invention is to collect Radiation status, Air Pollution and quality data, and Chemical Gas data while on the move and transfer to the centre, herewith any potential threads can be sensed and determined in a very early stage. The command and control centre has all the information to take the countermeasures. Since at least one or more mobile systems are collecting data, the data resolution gets higher with the number of mobile systems.

Another aim of the invention is to detect location of gunshot or explosion by using audio sensors installed on multiple systems on the field. Since at least one or more mobile systems are collecting data, the gun shot location accuracy gets higher with the number of mobile systems. By collecting the data, the gun shot map can be generated automatically to take the proper countermeasures.

Another aim of the invention is to automatically detect vehicle brand, model and colour as it reads the number plate.

Another aim of the invention is to read and collect all the writing in the city while the car is cruising the city by Mobile OCR Reader function. Operator than can search by any writing ex: a shop or a writing on a car etc.

Another aim of the invention is to be able to add any kind of sensors on said invention which acts as a mobile data collection and data transfer centre, and to be able to provide transfer of said records and analysis received from said sensors to the recording centre.

REFERENCES OF THE PARTS

1 Apparatus
  1.1 Top cover
  1.2 Body
    1.2.1 Mounting apparatus
  1.3 Camera
  1.4 Led lighting
  1.5 Police Lights
  1.6 General view camera
  1.7 Record device
  1.8 Alarm control device
  1.9 Ethernet connection
  1.10 Cooling device
  1.11 Control card
  1.12 modem
  1.13 Radar
  1.14 Lidar
  1.15 Terminal
  1.16 Connector
  1.17 Client
  1.18 Network
  1.19 Feeder 12 VDC
  1.20 Alarm
  1.21 GPS
  1.22 Wireless transfer device
  1.23 Thermal Camera (Optional)
  1.24 Audio Sensor (Optional)
  1.25 Radiation Sensor (Optional)
  1.26 Air pollution Sensor (Optional)
  1.77 Chemical gas Sensor (Optional)
  1.28 Fog and weather Sensor (Optional)
  1.29 Card Reader
  1.30 Fuse
  1.31 EMI Filter
  1.32 Edroid DVR

DETAILED DESCRIPTION OF THE INVENTION

Figure 1:
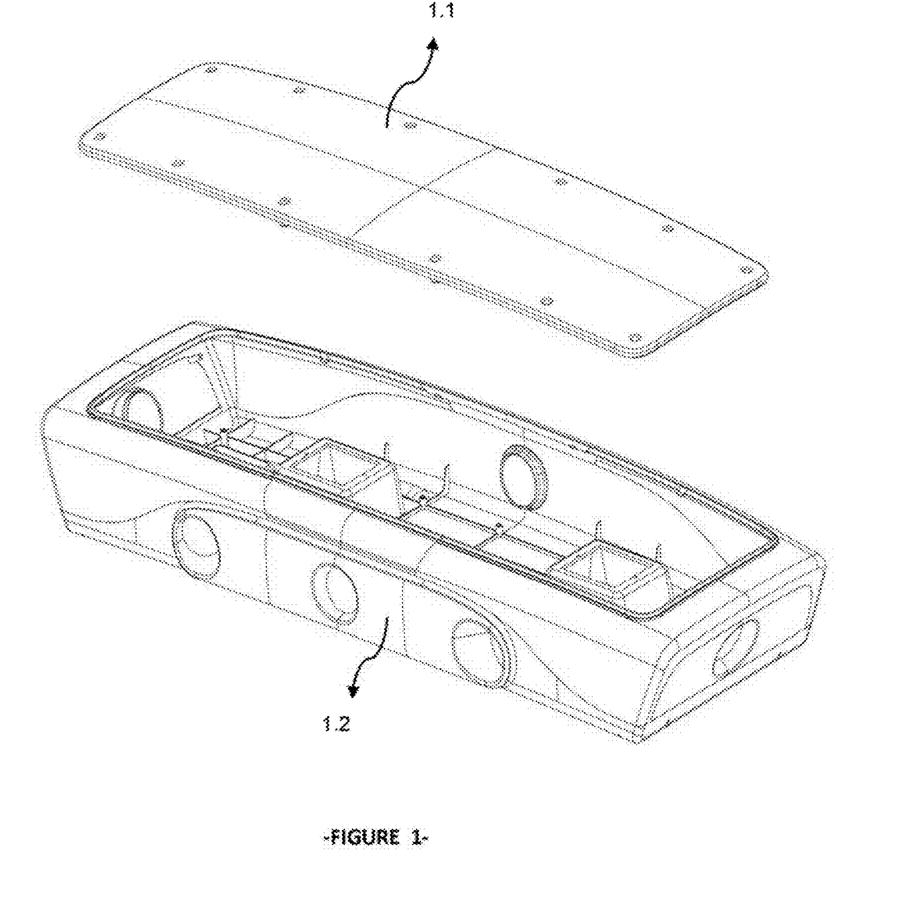
FIG. 1: Is the top cover view of the portable vehicle monitoring apparatus subject to the invention
Figure 2:
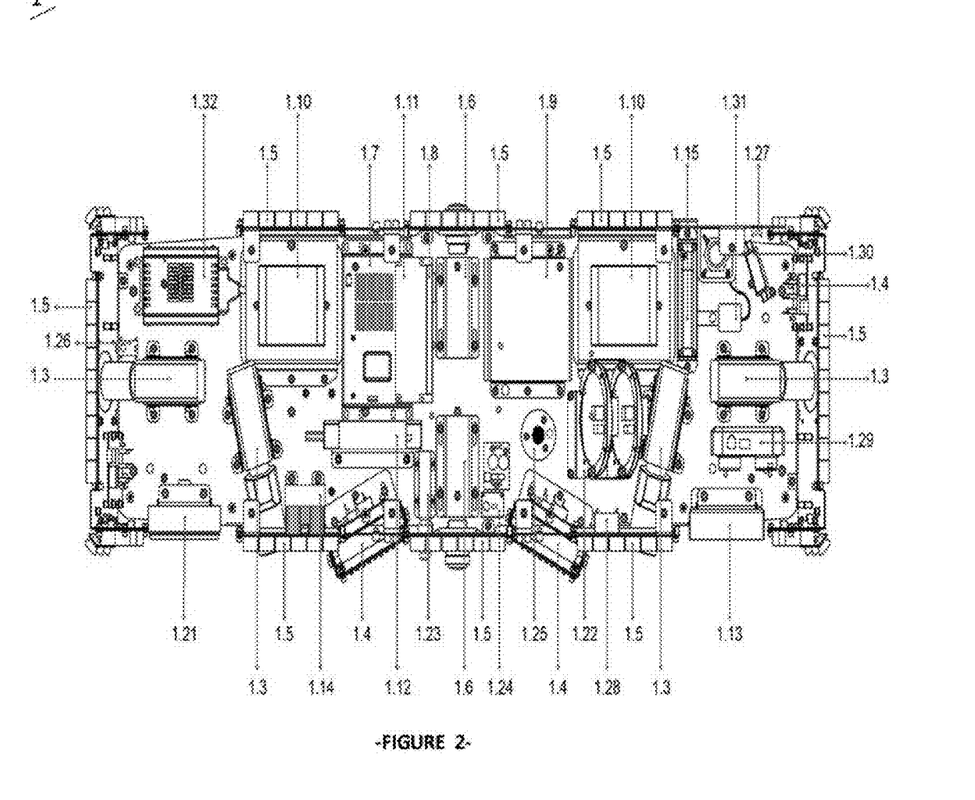
FIG. 2: Is the placement of the internal hardware of the portable vehicle monitoring apparatus subject to the invention
Figure 3:
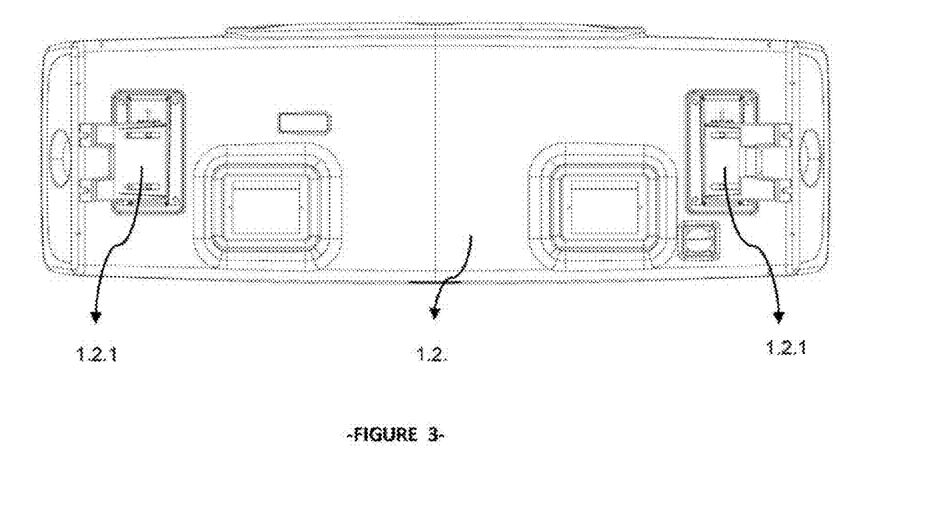
FIG. 3: Is the bottom view of the vehicle monitoring apparatus subject to the invention.

The invention is a portable license plate reader, speed sensor, city and road scanner, all kind of gas, audio, radiation and similar sensors and face recognition apparatus (1) which can be mounted on all kind of vehicles including but not limited to the mobile vehicles, vehicles for security purposes, such as police cars and other mobile vehicles which have right of way such as ambulances, characterized in that said license plate reader, speed sensor, city and road scanner, all kind of gas, sound, radiation and similar sensors and face recognition apparatus (1) comprises an apparatus (1.21) which enable coupling to the vehicle, a base (1.2) forming the structural frame of the apparatus onto which the mounting apparatus (1.2.1) is positioned, camera (1.3) mounted on the front right and front left and both sides of the base (1.2) which enable recording by the apparatus and face recognition functions, LED lighting (1.4) located around the cameras (1.3) which are directed towards visual direction and which enable capturing of legible images even at night time, a general view camera (1.6) positioned behind the base (1.2), which can carry out image resolution within itself, which can encode the data that can be used by the central software into the database, and which can control via a protocol that is compliant with the software, police lights (1.5) placed at the front and rear faces of the base (1.2) which can flash on and off when necessary, recording device (1.7) positioned on the base (1.2) which stores the Obtained data and images, having a server, an alarm control device (1.8) which manages the alarm (1.20), Ethernet connection (1.9) forming the network, a cooling device (1.10) which eliminates the heat formed inside the apparatus, a control card (1.11) which operates the police lights, 3G/4G modem (1.12) which continuously provides wireless communication and a top cover (1.1) which encloses the whole apparatus, omni-directional gunshot and audio sensors (1.24), air pollution sensor (1.26), chemical gas sensor (1.27), radiation sensors (1.25), fog and weather sensor (1.28) and a lidar (1.14) to precisely detect, track, classify objects in 3D and a GPS module (1.21) from which all the positions of and violation information of all license plates are obtained. System logs the maintenance operations with Card Reader (1.29). Any un-authorized attempt to open the device will trigger an alert. System is equipped with Fuse (1.30) to protect the system from overload from power line. System is equipped with EMI Filter (1.31) to make the system more immune to electromagnetic interference signals. System comes with 24/7 additional continuous surveillance recording Edroid DVR (1.32) which operator can search for video archive.

The system detects the visibility range, fusions, analysis the collected data from the various sensors, detects and tracks the object information like speed, location and dimensions in all conditions including but not limited to the heavy fog and/or had weather conditions.

Figure 4:
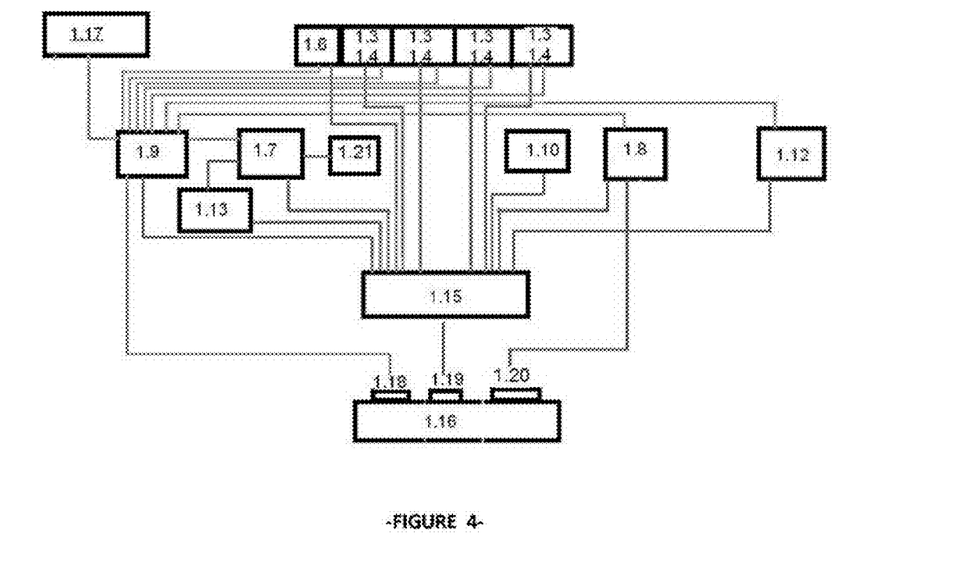
FIG. 4: Is the connection scheme of the vehicle monitoring apparatus subject to the invention
Figure 5:
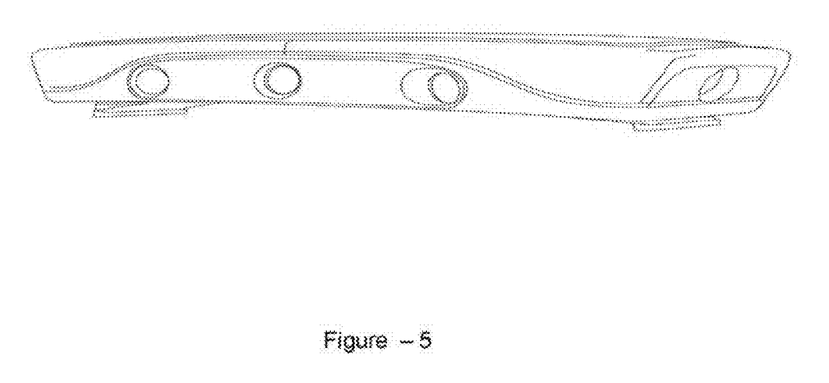
FIG. 5: Is the plug and play compact integrated structure of the invention

Said portable license plate reader, speed sensor, city and road scanner, all kind of gas, audio, radiation and similar sensors and face recognition system (1) operates with a 12 VDC (1.19) voltage. By this means it is sufficient to use a portable source, and there is no obligation for the system to be placed in a fixed position. In the speed sensor system (1) an additional client (1.17) and network (1.18) system is used.

Said portable license plate reader, speed sensor, city and road scanner, all kind of gas, audio, radiation and similar sensors and face recognition system (1) is able to simultaneously and automatically capture and read the license plates, detect brand, type, model and color of the car, determine their speeds, determine their exact parking position and location if parked, and perform recognition function, such as object recognition, face recognition, for all vehicles, people and objects that are in the area of the said scanner system utilizing the system, by means of the cameras (1.3) mounted thereon.

Said portable license plate reader, speed sensor parking violation detection, city and road scanner, all kind of gas, audio, radiation and similar sensors, object detection, tracking, classifying and face recognition, on the move, 3D scanner system (1) can minimize energy consumption by means of the LED lights (1.4) and can capture images and read license plates even during night time.

Said portable automatic license plate reader, speed sensor parking violation detection, city and road scanner, all kind of gas, audio, radiation and similar sensors, object detection, tracking, classifying and face recognition, on the move, 3D scanner system (1) can also determine the speed of the vehicle.

The recording device (1.7) comprise local files and a database server. The related data is transferred to these local servers and to the main server via 3G/4G/LTE or similar modem (1.12) or wireless transfer device (1.22). The software of the recording device (1.7) is configured with an algorithm which can determine the speed, centimeter precise location, classification brand, model and color of vehicles and process the images that have been captured when the system is mobile.

The portable license plate reader, speed sensor parking violation detection, city and mad scanner, all kind of gas, audio, radiation and similar sensors, object detection, tracking, classifying and face recognition, on the move, 3D scanner system (1), can operate when the vehicle is on the move or when the vehicle is at a fixed position. The cameras (1.3) are in continuous recording state during operation and the file recorded in the recording device (1.7) is submitted to the server.

The portable license plate reader, speed sensor parking violation detection, city and road scanner, all kind of gas, audio, radiation and similar sensors, object detection, tracking, classifying and face recognition, on the move, 3D scanner system can collect Radiation status. Air Pollution and quality data, and Chemical Gas data while on the move and transfer to the centre, herewith any potential threads can be sensed and determined in a very early stage. The command and control centre has all the information to take the countermeasures. Since at least one or more mobile systems are collecting data, the data resolution gets higher with the number of mobile systems.

The portable license plate reader, speed sensor parking violation detection, city and road scanner, all kind of gas, audio, radiation and similar sensors, object detection, tracking, classifying and face recognition, on the move, 3D scanner system can detect location of gunshot or explosion by using audio sensors installed on multiple systems on the field. Since at least one or more mobile systems are collecting data, the gun shot location accuracy gets higher with the number of mobile systems. By collecting the data, the gun shot map can be generated automatically to take the proper countermeasures.

The image that is transferred to the server is processed by means of the special software located inside the server and the license plates are read and the information is submitted to the database (SQL) server. As the photograph of the vehicle taken simultaneously when the license plate image is being captured can be counted as evidence if necessary, the file of said images are submitted to the server. The speed information is obtained via RS-485 connection from the 3-dimension radar (1.13) that has been synchronized when the license plate of the vehicle is being read and this information is transferred to and saved in the database. The software located in the server, allocates the speed limit information of the region by using the GPS (Global Positioning System) located on the 3G/4G/LTE modem (1.12) and when a speed that is over the speed limit is sensed, the speed violation of the vehicle whose license has been captured is recorded into the database. The license plate of all of the vehicles that have been read are recorded together with the OPS information thereof and as a result when an enquiry is being made, information on the locations that the vehicle has passed through can be obtained.

Figure 6:
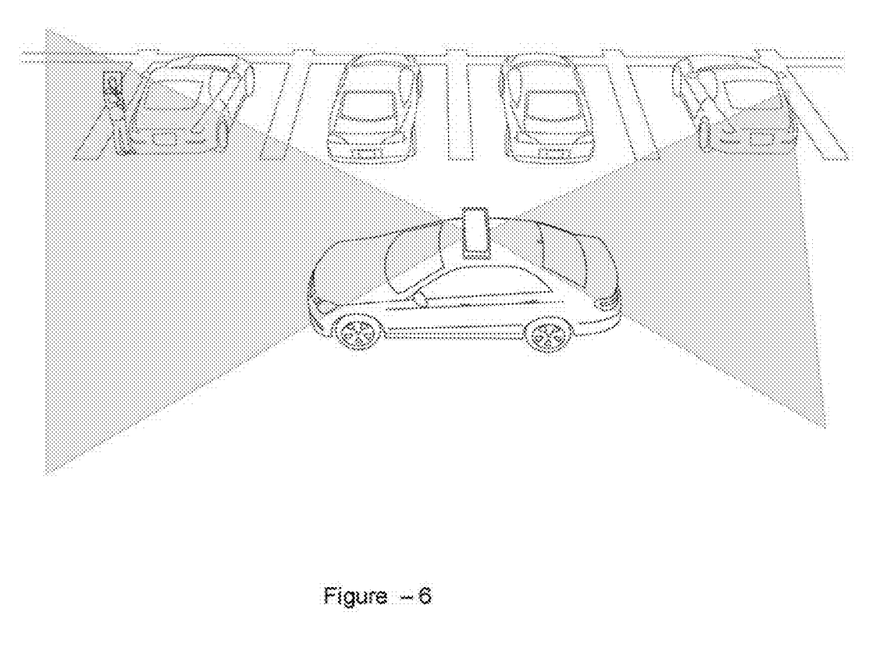
FIG. 6: Is the view where the face recognition function is carried out by the Invention at a mobile state
Figure 7:
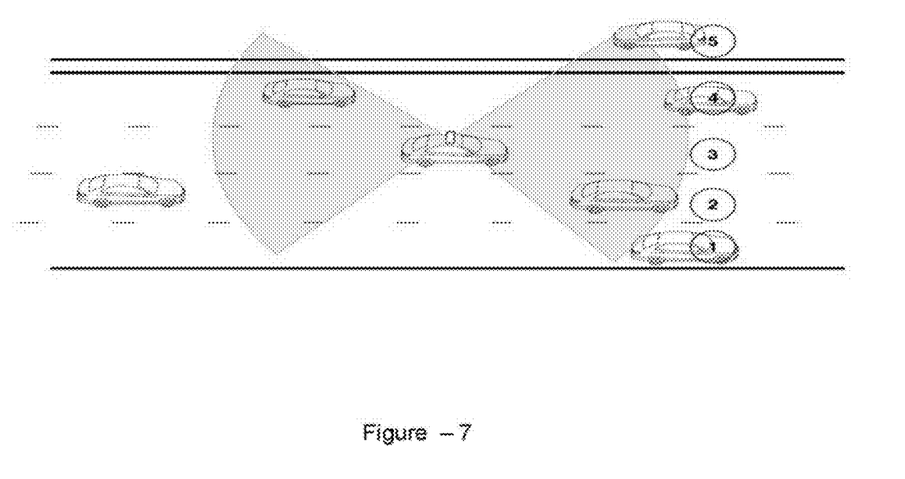
FIG. 7: Is the view of the invention which can carry out license plate reading in a total of five lanes, including the opposite lanes when a single and only vehicle is on the move.
Figure 8:
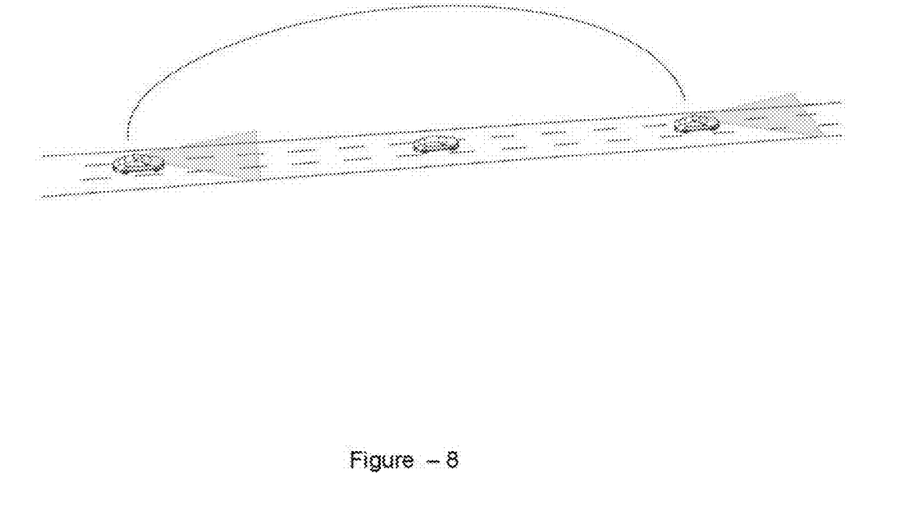
FIG. 8: Is the view of the invention which can provide the average speed information between the fixed license plate reading station and a vehicle on the move or between a single and only or two or more smart vehicles on the move.
Figure 9:
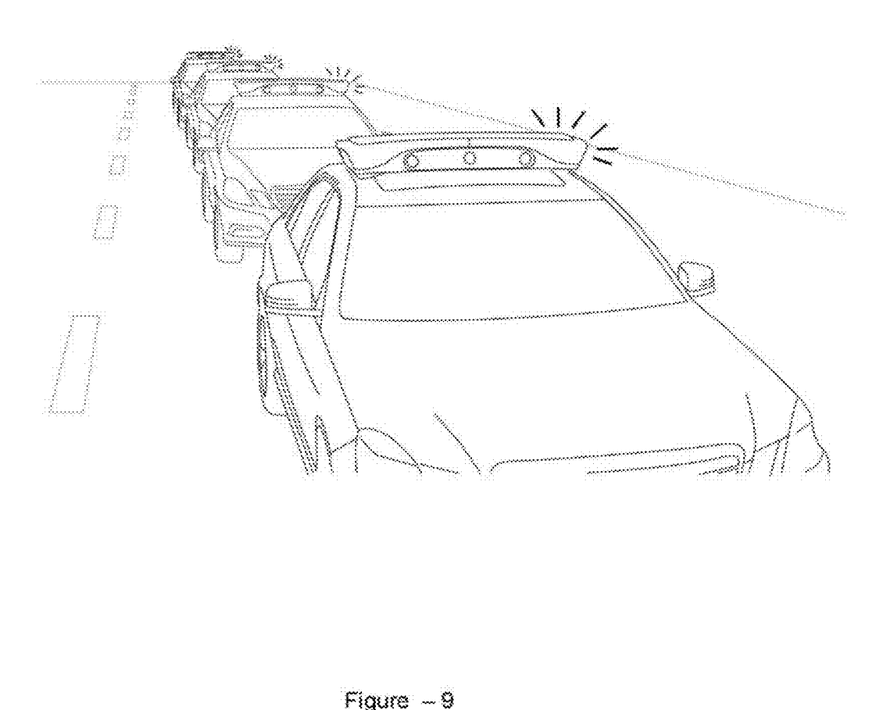
FIG. 9: Is the view of the virtual synchronized operability of a plurality of smart vehicles with each other when they are on the move or at a fixed position according to the invention.

The face recognition module of the portable license plate reader, speed sensor parking violation detection, city and road scanner, all kind of gas, audio, radiation and similar sensors, object detection, tracking, classifying and face recognition, on the move, 3D scanner system (1), can operate when the relative speed is maximum 100 km/h and when the vehicle is on the move or when it is at a fixed position. The cameras (1.3) are on constant record during their operation and they provide images to the file server located in the record device (1.7). The images of the faces are processed by means of the special software located on the server and the license plates recorded therein are read and saved into the database (SQL) server. An automatic alarm is formed when the necessary enquire is carried out.

The portable license plate reader, speed sensor parking violation detection, city and road scanner, all kind of gas, audio, radiation and similar sensors, object detection, tracking, classifying and face recognition, on the move, 3D scanner system (1) can transmit power, network and can provide alarm connection via the connector (1.16) with the vehicle. The power is distributed to the components within the system by means of a terminal (1.15). the user can track the information it has obtained from the system, through the data processing device transiently by means of a network connection. Penalty fines or reporting can be carried out automatically and the user can report the incident if necessary and can carry out tracking and enquiries and can fine a penalty. The cameras (1.3) are operated constantly for security reasons and the user can have access to the records via a data processing device.

The 3G/4G/LTE LTE modem (1.12), constantly transmits location information, the entire vehicle information (license plates, images, speed) and face recognition information to the recording center. The vehicle is monitored at this center and security of said vehicle is provided and quick intervention is enabled, and license plates can be enquired (in order to capture, illegal or stolen vehicles, or vehicles that are being searched) and face recognition procedures can be carried out.

The alarm control device (1.8) can control the system by means of the DI and DO sensors. The alarm can be triggered automatically or manually via a user command if necessary.

The invention claimed is:

1. A portable apparatus which can be mounted on a vehicle for security purposes, comprising:
   a mounting apparatus which enables coupling of the portable apparatus to the vehicle;
   a base forming a structural frame of the portable apparatus onto which the mounting apparatus is positioned;
   a first camera mounted on a left portion of a front side of the base;
   a second camera mounted on a right portion of the front side of the base;
   a third camera mounted on a left side of the base;
   a fourth camera mounted on a right side of the base;
   a plurality of LED lights located around the cameras which are directed towards a visual direction and which enables capturing of legible images even at night time;
   a general view camera positioned behind the base, which can carry out image resolution;
   a plurality of police lights placed at a front and a rear face of the base which are capable of flashing on and off;
   a recording device positioned on the base which stores a plurality of obtained data and images, wherein the recording device comprises a database server;
   an alarm control device;
   an ethernet connection forming the network,
   a cooling device which eliminates any heat formed inside the portable apparatus;
   a control card configured to operate the police lights;
   a modem configured to provide wireless communication;
   a top cover which encloses and seals off the portable; and
   a lidar system configured to obtain a speed information of other vehicles and recording said speed information to the database server;
   a face recognition module configured to recognize persons;
   a radiation sensor configured to detect radiation;
   a license plate reader configured to read license plates of other vehicles;
   wherein a longitudinal axis of the first camera and a longitudinal axis of the second camera intersect with each other, and a longitudinal axis of the third camera and a longitudinal axis of the fourth camera coincide with each other.

2. The portable apparatus of claim 1, further comprising a radar configured to obtain the speed information of other vehicles and recording said speed information to the database server.

3. The portable apparatus of claim 1, wherein the lidar system is configured to obtain a parking position of said other vehicles.

4. The portable apparatus of claim 1, further comprising an air pollution detection sensor, wherein the air pollution detection sensor is configured to detect an amount of different gases emitted by each individual vehicle of said other vehicles and recording said information to the database server.

5. The portable apparatus of claim 4, wherein the database server is configured to compare the amount of different gases emitted by said each individual vehicle to a threshold pollution value and issue a warning if said amount of gas emission is more than the threshold pollution value.

6. The portable apparatus of claim 1, further comprising an audio sensor, wherein said audio sensor is configured to recognize an explosion sound and transfer location co-ordinates of said explosion sound to the database server and other nearby security vehicles.

7. The portable apparatus of claim 1, further comprising a weather sensor configured to detect weather parameters and choose a speed and position determining device amongst the lidar system and a radar system.

8. The portable apparatus of claim 1, further comprising a terminal which is capable of distributing power to the portable apparatus.

* * * * *